United States Patent
Okada et al.

(10) Patent No.: US 8,570,583 B2
(45) Date of Patent: Oct. 29, 2013

(54) METHOD FOR CONTROLLING AN IMAGE FORMING APPARATUS USING INFORMATION FROM A DETACHABLE RECORDING MEDIUM

(75) Inventors: Daisuke Okada, Tokyo (JP); Nobuhiro Shindo, Tokyo (JP); Naruhiko Ogasawara, Tokyo (JP); Takeshi Fujita, Tokyo (JP); Kazuma Saito, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 1522 days.

(21) Appl. No.: 11/924,842

(22) Filed: Oct. 26, 2007

(65) Prior Publication Data

US 2008/0117447 A1 May 22, 2008

(30) Foreign Application Priority Data

Nov. 6, 2006 (JP) ................................ 2006-300701
Jun. 22, 2007 (JP) ................................ 2007-165489

(51) Int. Cl.
*G06K 15/00* (2006.01)
*G06K 1/00* (2006.01)
*G06F 3/12* (2006.01)
*G06F 15/00* (2006.01)

(52) U.S. Cl.
USPC .......... 358/1.16; 358/1.15; 358/1.17; 358/1.9

(58) Field of Classification Search
None
See application file for complete search history.

(56) References Cited

U.S. PATENT DOCUMENTS

| | | | | |
|---|---|---|---|---|
| 6,937,356 B1* | 8/2005 | Ito et al. | ........................ | 358/1.16 |
| 7,791,754 B2* | 9/2010 | Takahashi | ..................... | 358/1.15 |
| 7,826,087 B2* | 11/2010 | Kumagai | ..................... | 358/1.16 |
| 2003/0058471 A1* | 3/2003 | Okubo | .......................... | 358/1.16 |
| 2003/0090697 A1* | 5/2003 | Lester et al. | ................. | 358/1.14 |
| 2003/0151596 A1* | 8/2003 | Moyne et al. | ................. | 345/173 |
| 2004/0179216 A1* | 9/2004 | Reese et al. | ................. | 358/1.11 |
| 2006/0001909 A1* | 1/2006 | Kawaura | ..................... | 358/1.16 |

FOREIGN PATENT DOCUMENTS

| JP | 2001-341362 | 12/2001 |
|---|---|---|
| JP | 2003-108385 | 4/2003 |
| JP | 2005-301903 | 10/2005 |
| JP | 2006-035768 | 2/2006 |

OTHER PUBLICATIONS

Japanese Office Action issued Sep. 6, 2011, in Patent Application No. 2007-165489.

* cited by examiner

*Primary Examiner* — Ming Hon
(74) *Attorney, Agent, or Firm* — Oblon, Spivak, McClelland, Maier & Neustadt, L.L.P.

(57) ABSTRACT

An image processing apparatus, method, and computer readable storage medium in which a controller or control means recognizes whether information read from a detachable recording medium can be applied to the image forming apparatus based on the information stored in a memory of the image processing apparatus and a removable recording medium. When the detachable recording medium is recognized as containing information which can be applied to the image processing apparatus, the information from the detachable recording medium is loaded into the image forming apparatus.

22 Claims, 11 Drawing Sheets

METHOD FOR CONTROLLING AN IMAGE FORMING APPARATUS USING INFORMATION FROM A DETACHABLE RECORDING MEDIUM

CROSS-REFERENCE TO RELATED APPLICATIONS

This application claims the benefit of Japanese Patent Application No. 2006-300701 filed 6 Nov. 2006 and No. 2007-165489 filed 22 Jun. 2007 in the Japanese Patent Office the disclosure of which is hereby incorporated by reference.

BACKGROUND OF THE INVENTION

1. Field of the Invention

The present invention relates to an image processing apparatus, a control method for the image processing apparatus, and a computer readable storage medium.

2. Description of the Related Art

An image processing apparatus, such as copier, scanner, facsimile device, printer, and multi function device (MFD), may be used in several types of office environments and configuration information or a management record corresponding to the environment is stored in the image processing apparatus. A user has to reconfigure the configuration information when using a spare image processing apparatus when the normal image processing apparatus is being repaired or checked. The user often reconfigures the spare apparatus manually, and this takes a time and prevents the image processing apparatus from being used during the reconfiguration.

Regarding the related art, a printer that writes the configuration information or the history of the printer into a memory card and reads them out has been proposed. However, uniformly applying the configuration information or history to another printer may cause some trouble and may cause the printer to malfunction or may compromise a security function and leak security information.

SUMMARY OF THE INVENTION

It is an object of the present invention to prevent the image processing apparatus applying wrong information from a removable memory.

The invention includes an image processing apparatus, method, and computer readable storage medium. A controller or control means recognizes whether information read from a detachable recording medium can be applied to the image forming apparatus based on the information stored in a memory of the image processing apparatus and a removable recording medium. When the detachable recording medium is recognized as containing information which can be applied to the image processing apparatus, the information from the detachable recording medium is loaded into the image forming apparatus.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

First Embodiment

Figure 1:
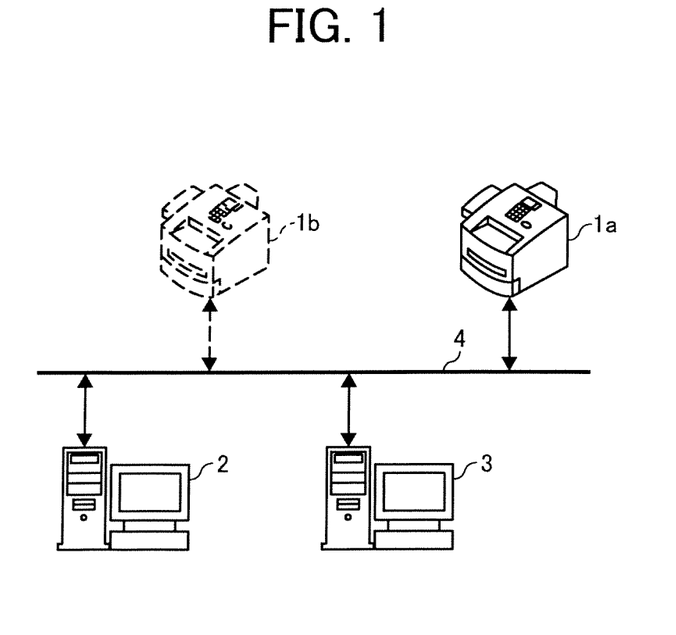
FIG. 1 illustrates an example of a system using the image processing apparatus of the invention.

Referring now to the drawings, wherein like reference numerals designate identical or corresponding parts throughout the several views, and more particularly to FIG. 1 thereof, there is illustrated an example of a system using a printer 1a and 1b as an example of an image processing apparatus. As shown in FIG. 1, the printer 1a is connected to a network 4 and prints print data received from a client device 2 or 3 such as a personal computer or a server computer. The printer 1a is normally used and the printer 1b is used as an alternative printer if the printer 1a is unavailable because it is being repaired, diagnosed, or checked. Since the hardware layout and internal function described below are basically the same between the printers 1a and 1b, a detailed description of the hardware layout and internal function is provided with respect to just the printer 1a.

Figure 2:
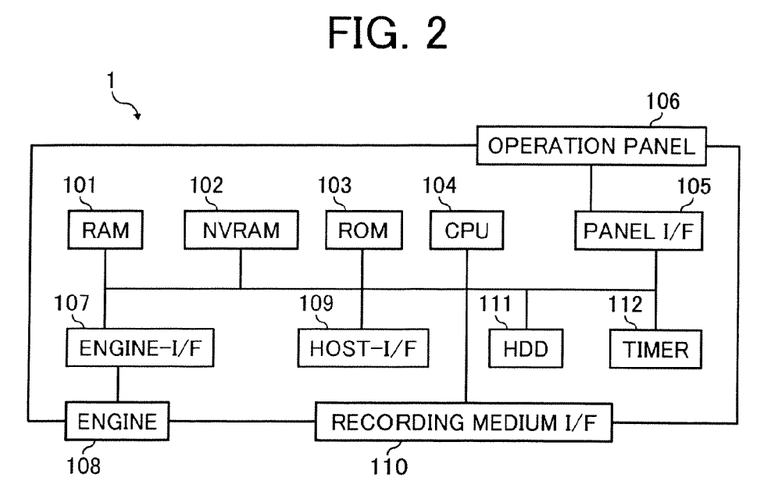
FIG. 2 illustrates an example of a hardware layout of the image processing apparatus.

FIG. 2 illustrates an example of a hardware layout of the printer 1a. As shown in FIG. 2, the printer 1a includes a RAM 101, a NVRAM (Non-Volatile RAM) 102, a Rom 103, a CPU 104, a panel I/F (interface) 105, an operation panel 106, an engine I/F 107, an engine 108, a host I/F 109, a recording medium I/F 110, a HDD (hard disk drive) 111, and a timer 112.

RAM 101 is a memory generally constructed with a volatile memory such as DRAM. A variety of programs and/or data such as firmware or font data of the printer 1a stored in ROM 103 and information stored in NVRAM 102 or HDD 111 are loaded into RAM 101 by the CPU 104. The CPU 104 controls a variety of functions, described below.

NVRAM 102 is non-volatile memory and stores information regarding an operation environment or operation log of the printer 1a. Examples of NVRAM include but are not limited to flash memory, EPROMs, or EEPROMs. ROM 103 stores a variety of programs such as firmware or a font program or data used to print, for example.

The panel I/F 105 receives a variety of instructions through the operation panel 106 and serves as an interface between the operation panel 106 and the control unit described below. The operation panel 106 receives a variety of instruction by an operator and displays a status of the printer 1a.

The engine I/F 107 is an interface between the engine 108 and the control unit described below. The engine 108 generates image data and prints it on the printing paper. A known printer engine may be used for the engine 108 which uses an electro-photography technique, an ink-jet technique, a thermal transfer technique or any other appropriate technique. The image which is printed can be from a computer, facsimile machine, scanner, or any appropriate source.

The host I/F 109 is an interface to communicate with the client device 2 or 3 over the network 4. The host I/F 109 also functions as a network interface. The recording medium I/F 110 is an interface between the printer 1a and a detachable recording medium such as a Secure Digital (SD) memory card, mini SD, micro SD, a Compact Flash (registered trademark), a Universal Serial Bus (USB) memory, a USB hard disk, SmartMedia, memory stick, XD, or any other appropriate detachable recording medium. The recording medium I/F 110 includes a card slot unit or other interface to communicate with the recording medium. For convenience, the invention is described using an SD memory card as an example of the detachable recording medium, although any detachable or separate recording medium can be used with the invention. The HDD 111 stores print data received from the client device 2 or 3. A destination address data or scanned data may be stored in the HDD 111 if a MFD that has a scanning function and a facsimile function is used instead of the printer.

Figure 3:
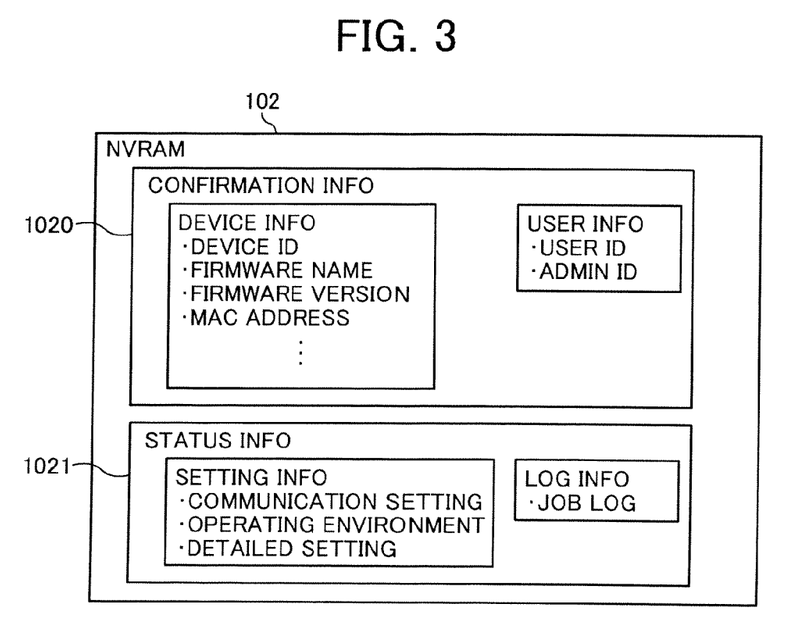
FIG. 3 illustrates an example of data stored in NVRAM of the image processing apparatus.

FIG. 3 illustrates an example of a data stored in NVRAM 102. As shown in FIG. 3, confirmation information 1020 and status information 1021 are stored in NVRAM 102. The confirmation information 1020 is used to recognize whether status information described below stored in another printer is applicable to the printer 1a and it includes device information and user information. The device information is information regarding the printer 1a and it includes a device ID, a firmware name and its version, and a MAC address, for example. The device ID may be a model name of the printer 1a, a serial number of a board as long as it is identifiable and corresponds to a respective printer. The user information is information regarding a user who owns, manages, or administers the printer 1a and includes a user ID and/or administrator ID.

The status information 1021 indicates information currently applied to the printer 1a and includes setting information and log information as an operation history.

The setting information is information regarding management of the printer 1a and includes a communication setting such as an IP address, subnet mask or gateway, an operating environment such as energy saving, and a detailed setting such as a paper tray to be used, a color of toner or whether the image is a color image, or a print language.

Figure 4:
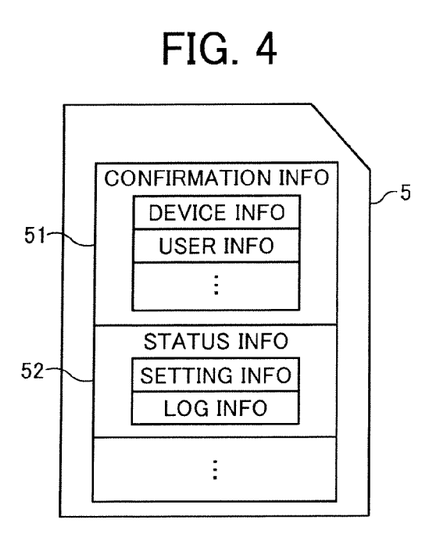
FIG. 4 illustrates an example of data in a detachable recording medium.

The log information includes an operating log such as a job log or supplies history that indicates the amount of toner, ink, or printing paper. Further, the log information may include an access log that indicates a history of logging in the printer 1a. The information that is stored in NVRAM 102 is also saved in the SD memory card 5 as shown in FIG. 4. In FIG. 4, the SD memory card 5 stores the confirmation information 51 and the status information 52 which is stored in NVRAM 102.

Figure 5:
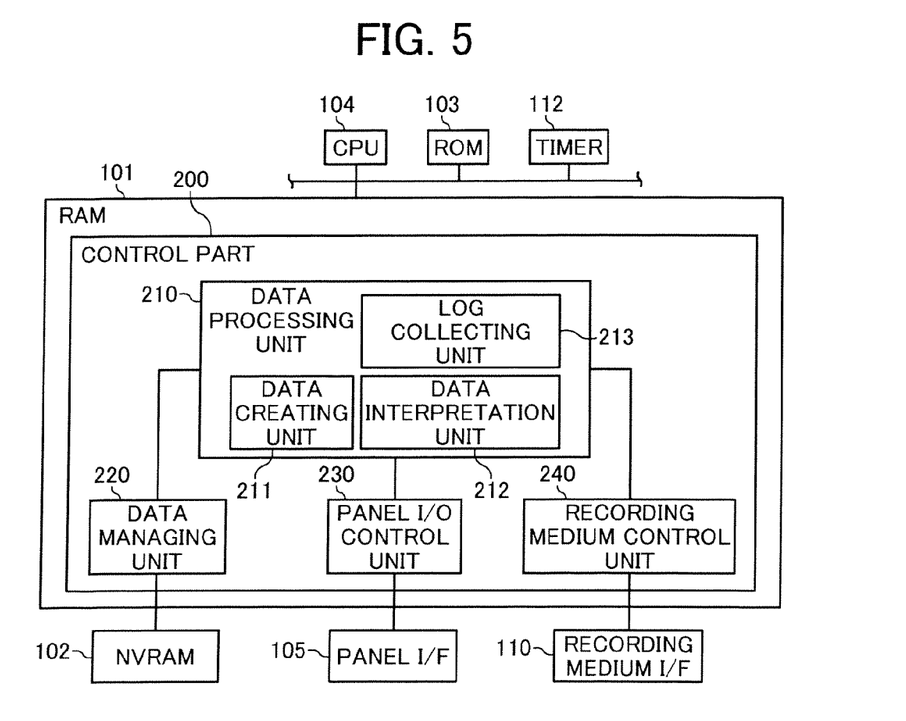
FIG. 5 illustrates an example of a functional block diagram in RAM as shown in FIG. 2.

FIG. 5 illustrates an example of a functional block diagram of RAM 101 and some elements connected thereto. In FIG. 5, the control part 200 that controls the operation of the printer 1a under the control of CPU 104 is configured in RAM 101 when the control program is loaded from ROM 103 to RAM 101. FIG. 5 represents the functions performed, and code is typically loaded into memory to carry out those functions. However, according to the invention, the code does not need to be loaded in any particular order or format. For example, the control part 200 controls the operation of the printer 1a based on a variety of information from NVRAM 102, HDD 111, and the client device 2 or 3. The control part 200 includes a data processing unit 210, a data managing unit 220, a panel I/O control unit 230, and a recording medium control unit 240. The data processing unit 210 further includes a data creating unit 211, a data interpretation unit 212, and a log collecting unit 213.

The data processing unit 210 processes various information handled in the printer 1a and controls a plurality of other units inside the data processing unit 210. The data creating unit 211 creates information that is output out of the data processing unit 210. The data interpretation unit 212 interprets information that is input into the data processing unit 210 for a successive process and converts the information in some cases. The log collecting unit 213 collects the log information of the printer 1a. The log information collected by the log collecting unit 213 is handled by the data creating unit 211 as data to be stored in NVRAM 102 and is stored in NVRAM 102.

The data managing unit 220 processes and controls various information between NVRAM 102 and the data processing unit 210. The panel I/O control unit 230 processes and controls various information between the panel I/F 105 and the data processing unit 210. The recording medium control unit 240 processes and controls various information between the recording medium I/F 110 and the data processing unit 210. In FIG. 5, though NVRAM 102, the panel I/F 105, and the recording medium I/F 110 are illustrated as connected directly with the control part 200. However, they are preferably connected with each other using a bus, as shown in FIG. 2.

Figure 6:
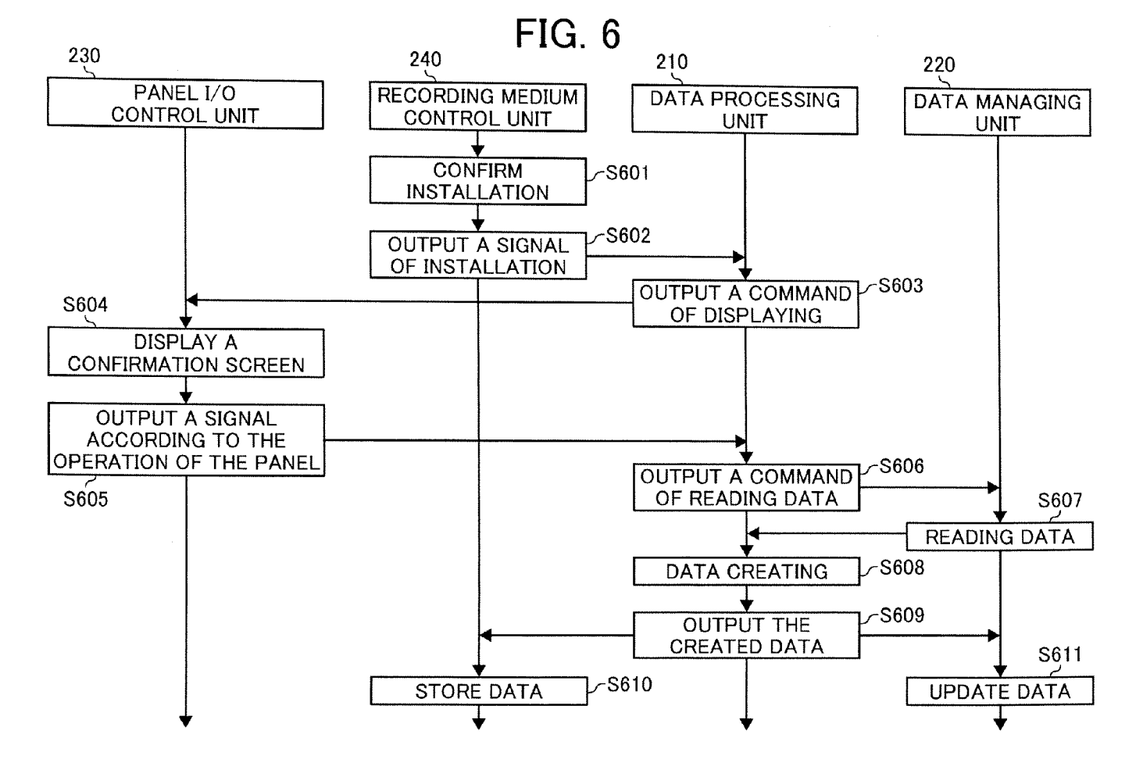
FIG. 6 illustrates an example of a process performed by the image processing apparatus.

FIG. 6 illustrates an example of a process performed by the units of the control part 200 when the SD memory card 5 is installed in the printer 1a. First, the recording medium control unit 240 confirms the installation of the SD memory card 5 into the recording medium I/F 110 in step S601. At step S602, the recording medium control unit 240 outputs a signal of installation indicating the SD memory card 5 is installed to the data processing unit 210.

At step S603, the data processing unit 210 causes the data interpretation unit 212 to interpret the signal of installation. Further, as a result of interpretation by the data interpretation unit 212, the data processing unit 210 causes the data creating unit 211 to create a display command to display a confirmation screen on the operation panel 106 and outputs the display command to the panel I/O control unit 230.

At step S604, the panel I/O control unit 230 receives the display command and displays the confirmation screen on the operation panel 106 through the panel I/F 105. The confirmation screen will be a screen prompting whether information regarding the printer 1a as shown in FIG. 3 may be stored or not, for example. At step S605, the panel I/O control unit 230 outputs a confirmation signal received according to the operation of the operation panel 106 to the data processing unit 210, through the panel I/F unit 105. At step S606, the data processing unit 210 receives the confirmation signal from the panel I/O control unit 230, and causes the data interpretation unit 212 to interpret the confirmation signal. Further, the data processing unit 210 outputs a reading command to the data managing unit 220 to read information from NVRAM 102.

At step S607, the data managing unit 220 reads the information from NVRAM 102. The information read from NVRAM 102 is the confirmation information 1020 and the status information 1021 as shown in FIG. 3 and they will be stored in the SD memory card 5.

At step S608, the data processing unit 210 causes the data creating unit 211 to create information to be stored into the SD memory card 5 based on the confirmation information 1020 and the status information 1021 that are read out of NVRAM 102. Further, the data creating unit 211 creates information to update the information stored in NVRAM 102. The created information by the data creating unit 211 includes a command to store the confirmation information 1020 and the status information 1021 into the SD memory card 5, and the information to update the information in NVRAM 102 includes a value indicating the SD memory card 5 is installed in the printer 1a, for example. At step S609, the data processing unit 210 outputs a command to update the information stored in NVRAM 102 with the value created by the data creating unit 211 to the data managing unit 220 and to the recording medium control unit 240.

At step S610, the recording medium control unit 240 receiving the command to store the confirmation information 1020 and the status information 1021 into the SD memory card 5, and stores the confirmation information 1020 and the status information 1021 into the SD memory card 5. At step S611, the data managing unit 220 receives the command to update the information stored in NVRAM 102, and updates the information stored in NVRAM 102.

According to the processing, the information stored in NVRAM 102 of the printer 1a is reflected into the SD memory card 5 as the confirmation information 51 and the status information 52, as shown in FIG. 4. Regarding step S608, the information to be stored into the SD memory card 5 may at least include the communication setting included in the status information 1021. Herewith, the printer 1b described below will be able to take over the communication setting of the printer 1a and the client device 2 or 3 also will be able to send the print data to the printer 1b in the same manner as sending to the printer 1a. In addition, regarding the status information 1021, it is preferable to encrypt this information to limit the operation by an operator who is not allowed to change the information stored in the SD memory card 5.

Figure 7:
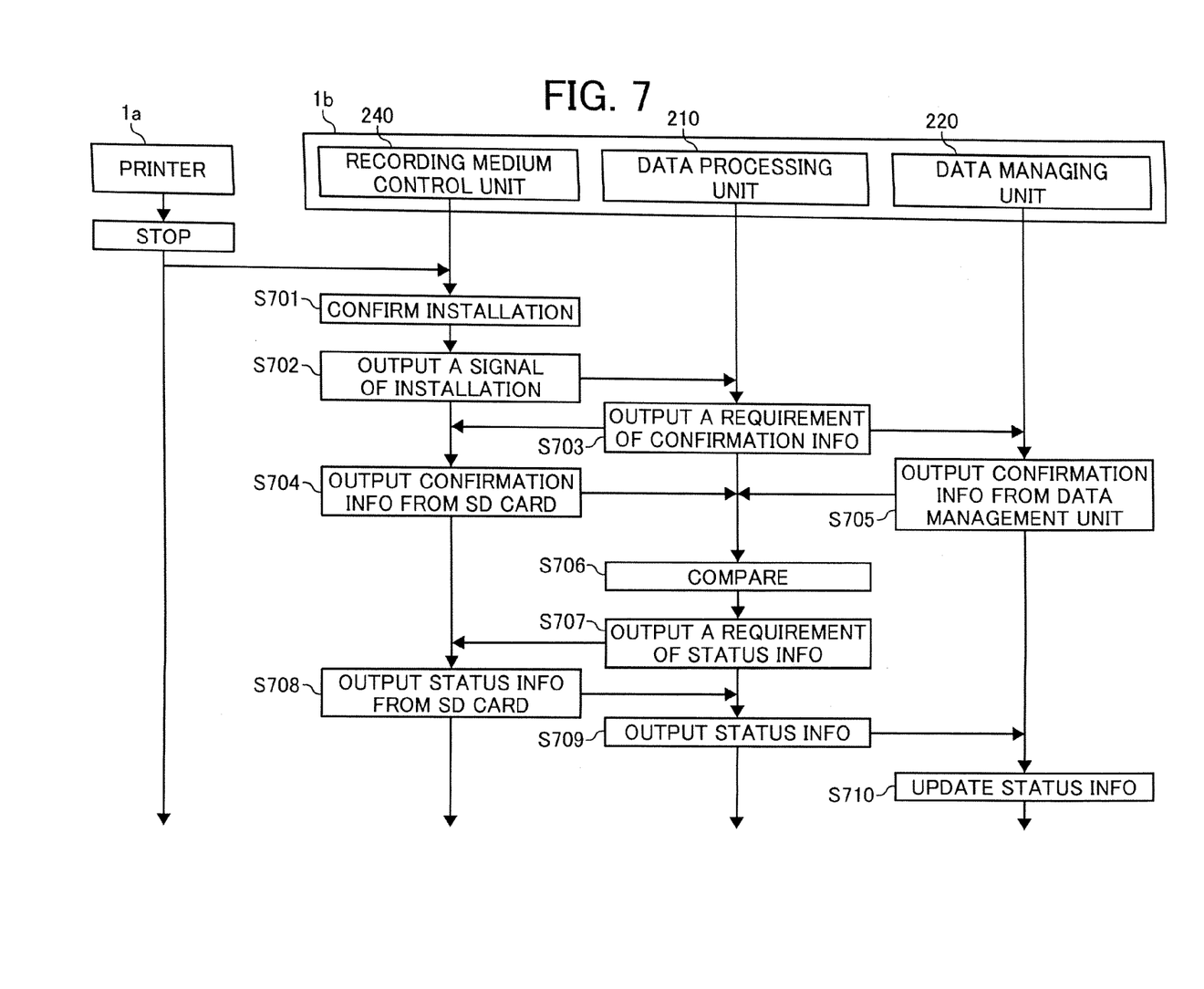
FIG. 7 illustrates an example of a process of applying information stored in the detachable recording medium to an image processing apparatus.

FIG. 7 illustrates an example of a process which transfers information stored in the SD memory card 5 to the printer 1b. In FIG. 7, it is supposed that the printer 1a has stopped operating due to a failure of the printer 1a. In this situation, if the SD memory card 5 is removed from the printer 1a by the operator and is installed in the printer 1b, the recording medium control unit 240 confirms whether the SD memory card 5 is installed at step S701. At step S702, the recording medium control unit 240 outputs a signal of installation, indicating the SD memory card 5 is installed to the data processing unit 210.

At step S703, the data processing unit 210 receives the signal of installation, and outputs a requirement of confirmation information to the recording medium control unit 240 and the data managing unit 220. At step S704, the recording medium control unit 240 receives the requirement of confirmation and reads the confirmation information 51 as shown in FIG. 4 from the SD memory card 5 and outputs the confirmation information 51 to the data processing unit 210. At step S705, the data managing unit 220 also receives the requirement of confirmation, reads the confirmation information 1020 as shown in FIG. 3 from NVRAM 102, and outputs the confirmation information 1020 to the data processing unit 210.

At step S706, the data processing unit 210 receives the confirmation information from the recording medium control unit 240 and the data managing unit 220 and compares whether they correspond with each other. In detail, the data processing unit 210 checks the device information or the user information included in the SD memory card 5 received from the recording medium control unit 240 with the device information or the user information included in NVRAM 102 received from the data managing unit 220. At step S707, if they correspond with each other, the data processing unit 210 outputs a requirement of the status information to the recording medium control unit 240.

At step S708, the recording medium control unit 240 receives the requirement and reads the status information 52 from the SD memory card 5 and outputs the status information 52 to the data processing unit 210. At step S709, receiving the status information 52, the data processing unit 210 outputs the status information 52 and a command to update the status information 1021 stored in NVRAM 102 to the data managing unit 220 using the received status information 52.

At step S710, the data managing unit receives the status information 52 and the command from the data processing unit 210 and updates the status information 1020 stored in NVRAM 102 using the received status information 52.

By utilizing or taking over information of an original printer, another printer can perform as an alternative printer for the original printer. In addition, the invention prevents another printer from applying the wrong information based on the comparison of the confirmation information of the original printer with the confirmation information of another printer.

Figure 8:
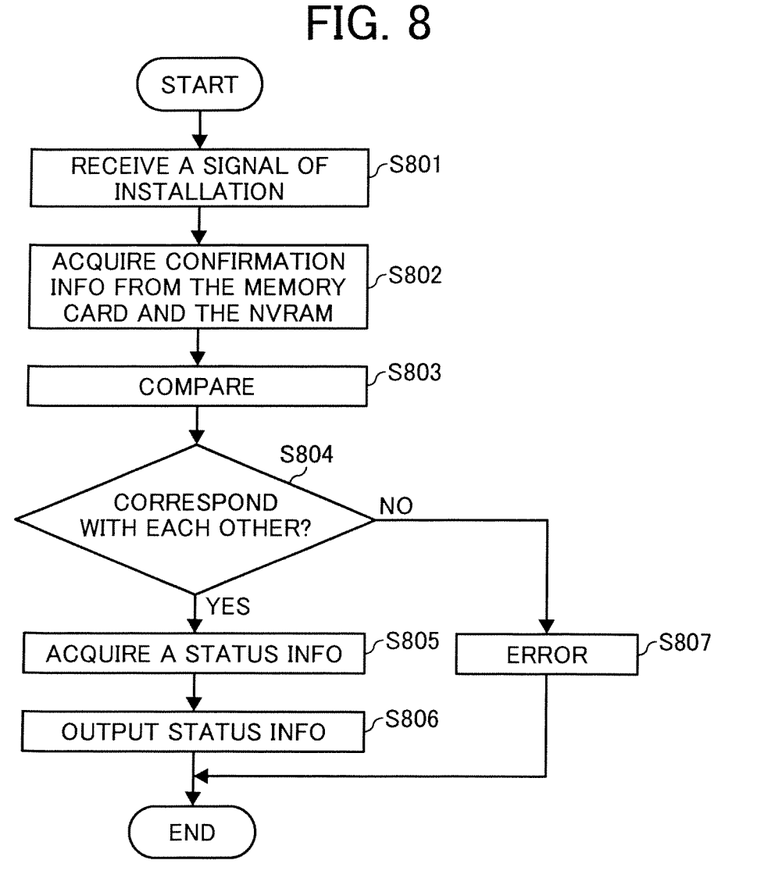
FIG. 8 is a flowchart of a process performed by the image processing apparatus.

FIG. 8 is a flowchart performed by the data processing unit 210 when performing the process of FIG. 7. After starting, in step S801, the data processing unit 210 receives the signal of installation. At step S802, the data processing apparatus obtains the confirmation information 51 from the SD memory card 5 through the recording medium control unit 240 and the confirmation information 1020 from NVRAM 102 through the data managing unit 220.

At step S803, the data processing unit 210 compares the confirmation information 51 that includes the device information and the user information of the printer 1a with the confirmation information 1021 that includes the device information and the user information of the printer 1b. In this comparison, the data processing unit 210 checks whether a character string of the device information read form the SD memory card 5 corresponds with a character string of the device information read from NVRAM 102 partly or completely, and recognizes it is possible to apply information stored in the SD memory card 5 to the printer 1b. As the character string of the device information, a letter, a number, a character, or a mark may be included. Further, the data processing unit 1 may recognize a specific description format, for example "111.222.333.444", such as an IP address so that the printer 1 can prevent from applying the wrong version of the IP address (e.g., IP address version 4 and version 6).

At step S804, the data processing unit 210 determines whether both of confirmation information corresponds with each other according to a result of the comparison. At step S805, the data processing unit 210 outputs the signal requiring the status information 52 to the recording medium control unit 240 if both of the confirmation information corresponds with each other. At step S806, the data processing unit 210 outputs the status information 52 and the command to update the status information 1021 stored in NVRAM 102 to the data managing unit 220. On the other hand, if it is not possible to apply information stored in the SD memory card 5 to the printer 1*b*, in step S807, the data processing unit 210 causes the panel I/O control unit 230 to display an error screen indicating information in the SD memory card 5 is not applicable.

After updating information stored in NVRAM 102 based on information read from the SD memory card 5, the control part 200 boots the printer 1*b* and the printer 1*b* works as an alternative printer based on information read from the SD memory card 5. The SD memory card may be installed while the printer 1*a* operates normally. In addition, the invention prevents the printer 1*b* from applying the wrong information and working unexpectedly.

Figure 9:
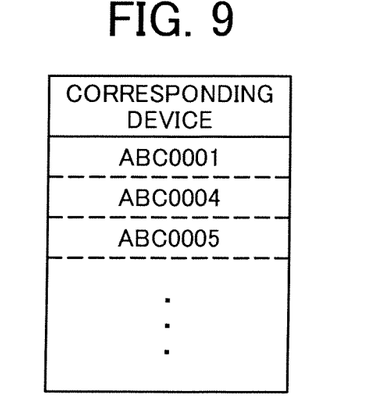
FIG. 9 illustrates an example of a database.

As another example of the comparison of step S803, the data processing unit 210 may relate the information of other printers that corresponds with the printer 1*b* as a database and refer the database, as shown in FIG. 9. The database shown in FIG. 9 includes model names that correspond to the printer 1*b* and is managed by the data processing unit 210. As an example, as shown in FIG. 9, the printer 1*b* corresponds with three printers whose model names are ABC0001, ABC0004, and ABC0005. Therefore, the printer 1*b* will be able to apply information of these printers.

Regarding FIG. 9, the data processing unit 210 reads information about the model name from the SD memory card 5 and refers to the database. If the information read from the SD memory card 5 has one of the model name ABC0001, ABC0004, and ABC0005, the data processing unit 210 recognizes the information stored in the SD memory card 5 as applicable to the printer 1*b*. On the other hand, if the information read from the SD memory card 5 does not have the model name included in the database, the data processing unit 210 recognizes the information stored in the SD memory card 5 as not applicable. The database may be created by a vendor of the printer and provided through a network such as a LAN, or an Internet, for example. In addition, instead of the model name, a serial number, MAC address, manufacturer, series number, or other identifying information may be included in the database.

Figure 10:
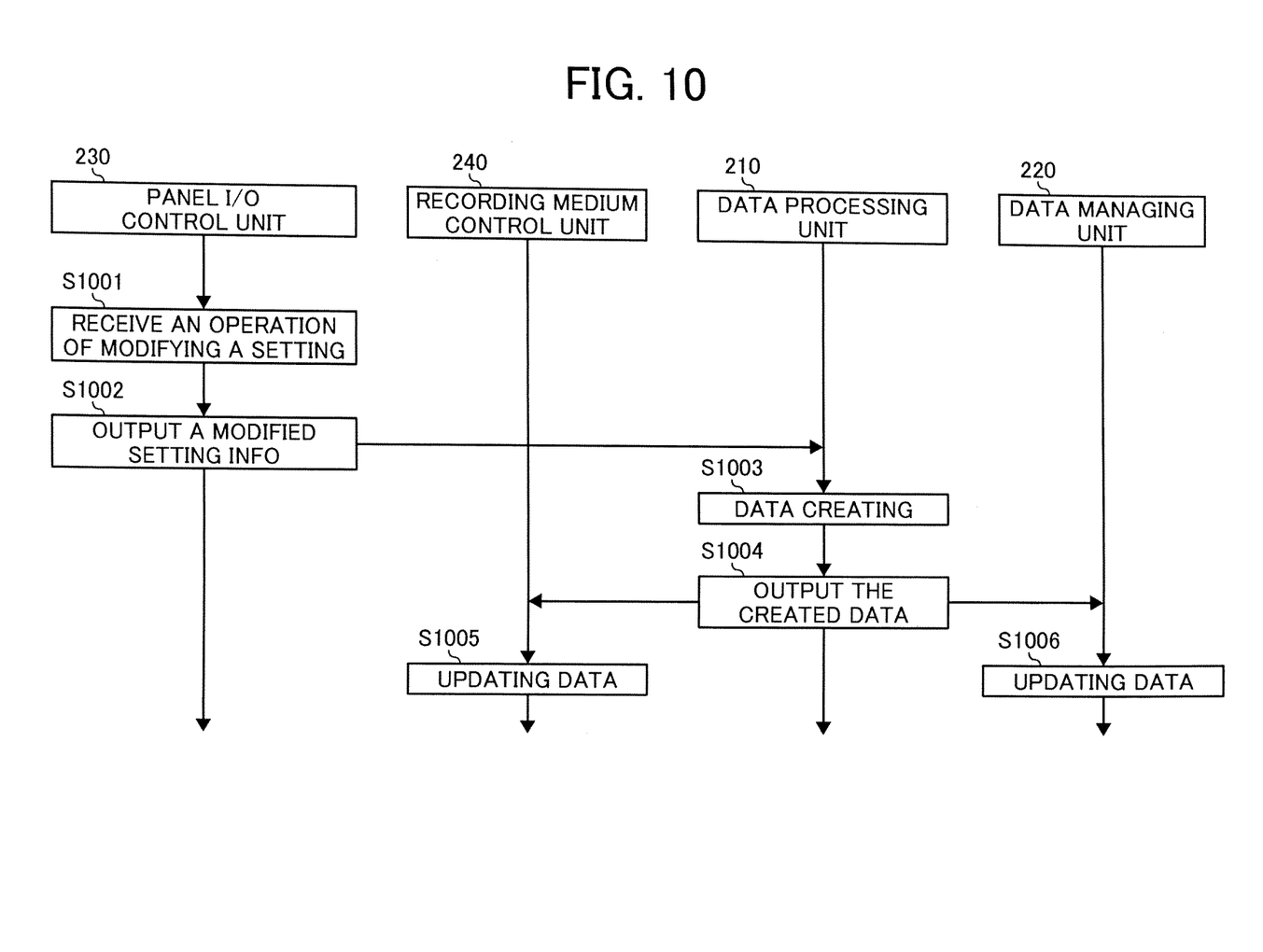
FIG. 10 illustrates an example of a process of updating information.

FIG. 10 illustrates an example of a process of updating information stored in the SD memory card 5 and NVRAM 102 when the setting of the printer 1*b* that is booted by the information stored in the SD memory card 5 is modified. At step S1001, the panel I/O control unit 230 recognizes an operation to modify a setting of the printer 1*b* by the user through the panel I/F 105. At step S1002, the panel I/O control unit 230 outputs a modified setting to the data processing unit 210.

At step S1003, the data processing unit 210 receives the modified setting from the panel I/O control unit 230, and causes the data interpretation unit 212 to interpret the modified setting. In addition, in response to the interpretation, the data processing unit 210 causes the data creating unit 211 to create data to update the information stored in the SD memory card 5 and NVRAM 102. At step S1004, the data processing unit 210 outputs information created by the data creating unit 211 with a command to update the information stored in the SD memory card 5 and NVRAM 102.

At step S1005, the recording medium control unit 240 updates the information stored in the SD memory card 5 to the modified setting. At step S1006, the data managing unit 220 updates the information stored in NVRAM 102 to the modified setting.

According to the processing described above, the modified setting will be reflected to not only the information stored in NVRAM 102 but also the information stored in the SD memory card 5. Alternatively, the modified setting may be reflected to the printer 1*b* periodically instead of with each by the user. In addition, the number of updating may be limited in the point of reducing access to the SD memory card 5.

Figure 11:
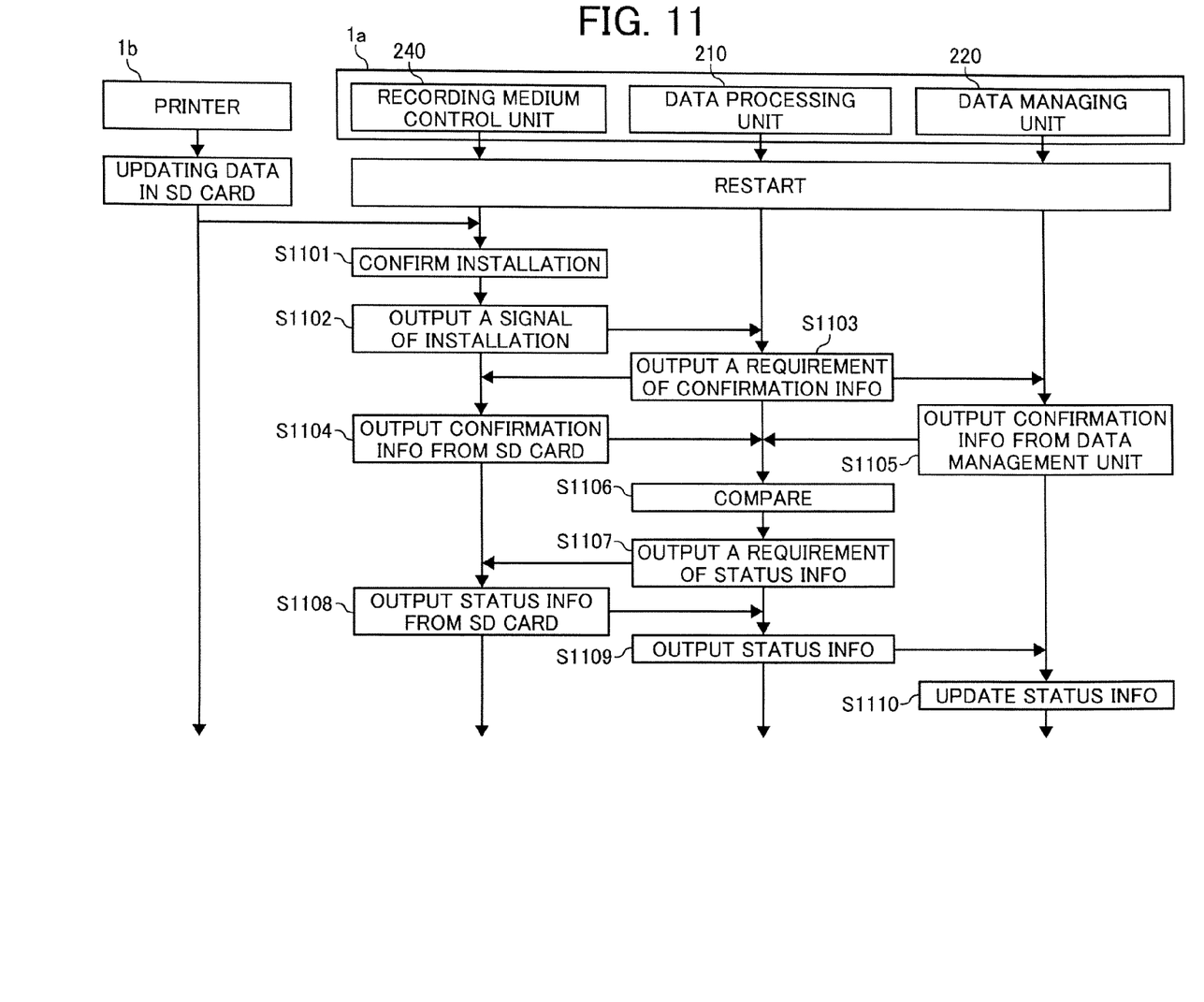
FIG. 11 illustrates an example of another process of applying the information stored in the detachable recording medium to an image processing apparatus.

FIG. 11 illustrates an example of a process of reflecting the setting of the printer 1*b* to the printer 1*a* in the case that the printer 1*a* recovers from repairing or checking information stored in the detachable recording medium to the image processing apparatus. The setting information has already been stored in the SD memory card 5. When the printer restarts and the SD memory card 5 is installed in the printer 1*a* again, the recording medium control unit 240 of the printer 1*a* confirms whether the SD memory card 5 is installed in the printer 1*a*, at step S1101.

The printer 1*a* that restarts its working operates in the same manner as described above with respect to step S702 and information stored in the SD memory card 5 is reflected to the printer 1*a* in step S1102. The processing of steps S1102-S1110 is the same as steps S702-S710 and the description thereof will be omitted.

In this embodiment, according to the process performed by the data processing unit 210, the status information 52 in the SD memory card 5 is applied to the alternative printer and the status information 1021 stored in NVRAM 102 is updated. The operation panel of the alternative printer may display a screen inquiring whether updating is to be conducted or not to let the user select before the updating. Further, a password to access the SD memory card 5 may be required to be entered, prior to updating.

In addition, the information stored in the SD memory card 5 from the printer may be information stored in ROM 103 or HDD 111 instead of NVRAM 102. Further, the information stored in the SD memory card 5 may be an IP address, an e-mail address, and/or a facsimile number.

In addition, the data processing unit 210 may confirm directly whether the status information read from the SD memory card 5 is applicable without comparing the confirmation information 51 read from the SD memory card 5 with the confirmation information 1020 read from NVRAM 102. In addition, the data processing unit 210 may compare the status information 51 read from the SD memory card 5 with the status information 1021 read from NVRAM 102. and apply the applicable status information stored in the SD memory card 5 to the printer 1*b*.

According to the first embodiment, it is possible to prevent the printer 1 from applying improper information using the processing described above.

Second Embodiment

Next, a description will be given of a second embodiment. Since the hardware layout and the functional block diagram is the same as the printer 1*a* and 1*b* described above, a detailed description of the structure will be omitted.

Figure 12:
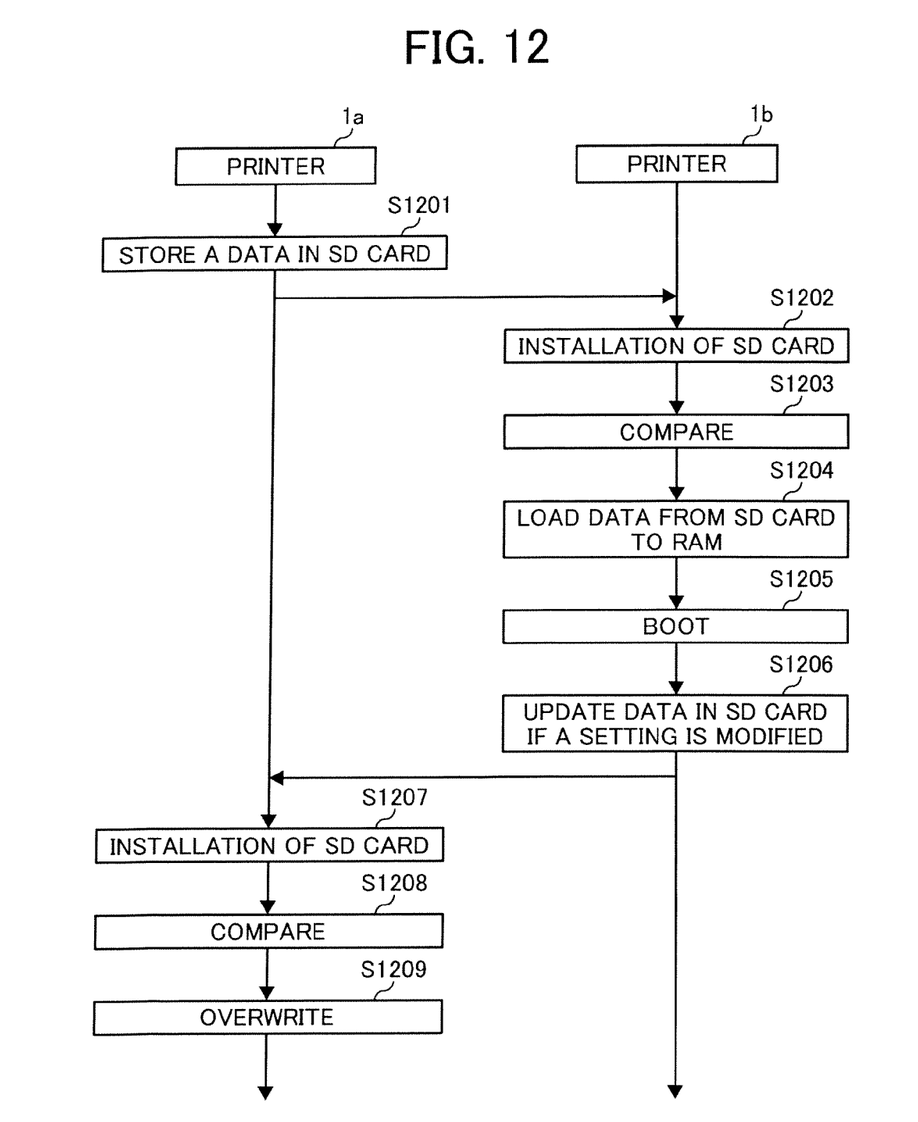
FIG. 12 illustrates another example of a process of updating information between image processing apparatuses.

FIG. 12 illustrates a process when the status information of the printer 1*a* is applied to the printer 1*b*. The difference of this embodiment from the first embodiment is information stored in NVRAM 102 of the printer 1*b* as an alternative printer is not updated by information read from the SD memory card 5.

At step S1201, the printer 1*a* stores the confirmation information 1020 and the status information 1021 in the SD memory card 5. After storing the confirmation information, the printer 1*a* stops its operation because of repairing, being checked up, or for some other reason. Then, the SD memory card 5 is removed from the printer 1*a* and installed in the printer 1*b*.

At step S1202, the recording medium control unit 240 of the printer 1*b* recognizes the installation of the SD memory card 5. At step S1203, the recording medium control unit 240 of the printer 1b reads the confirmation information 51 and the status information 52 from the SD memory card 5, and the data processing unit 210 compares them with information stored in NVRAM 102 of the printer 1b. For example, the data processing unit 210 compares the device information and user information of the printer 1a with those of the printer 1b.

At step S1204, if the information stored in the SD memory card 5 is applicable to the printer 1b, the data processing unit 210 causes the recording medium control unit 240 and the data managing unit 220 to load the information from the SD memory card 5 into the RAM 101. At step S1205, the data processing unit 210 boots the printer 1b based on the information. The information stored in NVRAM 102 is preferably not updated. If the setting(s) of the printer 1a read out to RAM 101 is (are) modified while the printer 1b operates based on the information regarding the printer 1a, the status information 52 stored in the SD memory card 5 is overwritten to the modified setting by the recording medium control unit 240, at step S1206. The log information read out to RAM 101 is also stored in the SD memory card 5 in the same manner. After this step, the SD memory card 5 is installed again in the printer 1a which restarted the operation.

At step S1207, the recording medium control unit 240 of the printer 1a recognizes the installation of the SD memory card 5. At step S1208, the recording medium control unit 240 of the printer 1a reads the information stored in the SD memory card 5 and the data processing unit 210 compares the information read from the SD memory card 5 with information such as the device information and the user information stored in the NVRAM 102 of the printer 1a. If the information read from the SD memory card 5 is applicable to the printer 1a, the data processing unit 210 causes the data managing unit 220 to overwrite the status information in NVRAM 102 of the printer 1a to the information read from the SD memory card 5, at step S1209.

According to the second embodiment, in addition to the effect by the first embodiment, it is possible to process in the printer 1b shortly since the status information of the printer 1b is left in NVRAM 102 and the data managing unit 220 does not access NVRAM 102.

Another Embodiment

In this embodiment, a function regarding the first and second embodiments described above can be performed selectively. Since the hardware layout and the functional block diagram is the same as the printer 1a and 1b described above, a detailed description of the structure will be omitted. A printer in this embodiment has a mode to perform the function selectively and will be described below as "printer 1".

Figure 13:
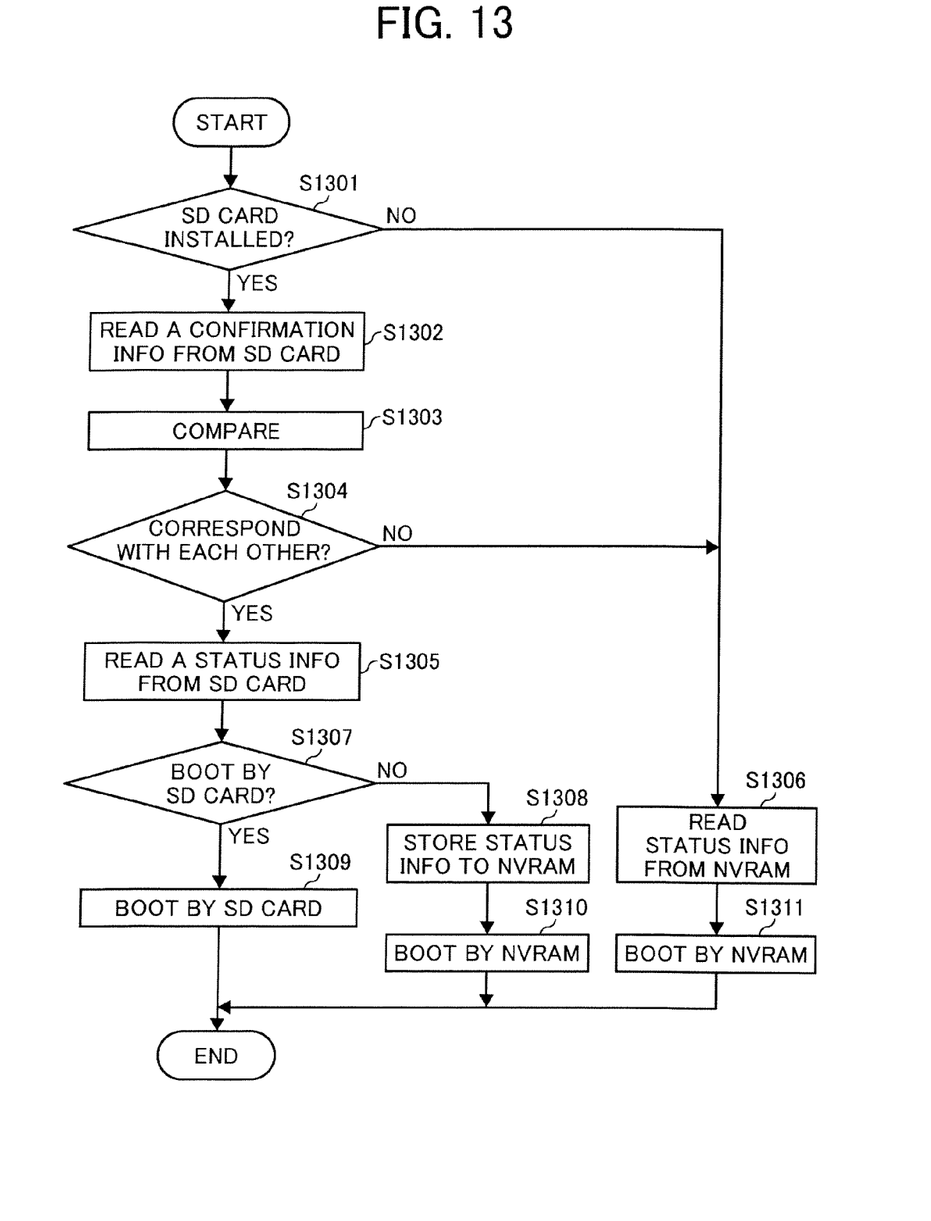
FIG. 13 is a flowchart of a boot mode.

FIG. 13 illustrates a process performed by the printer 1 according to current boot mode. At step S1301, the recording medium control unit 240 confirms whether the SD memory card 5 is installed. If the recording medium control unit 240 recognizes that the SD memory card 5 is not installed as a result of the confirmation, the process proceeds to step S1306. At step S1306, the data managing unit 220 reads the status information 1021 from NVRAM 102. The process proceeds to step S1311, and the data processing unit 210 causes the data managing unit 220 to boot based on the information read from NVRAM 102. After step S1311, the process ends and the printer 1 waits for an operation by the user.

On the other hand, if the installation of the SD memory card 5 is recognized in step S1301, the process proceeds to step S1302. At step S1302, the data processing unit 210 causes the recording medium control unit 240 and the data managing unit 220 to read the confirmation information 51 stored in the SD memory card 5 to RAM 101. At step S1303, the data processing unit 210 compares the confirmation information 51 with that stored in NVRAM 102. If it is determined in step S1304 that each appropriate item of the confirmation information in 51 does not correspond with what is stored in the NVRAM 102, the process proceeds to step S1306. After that, the printer 1 operates in the same manner as if the SD memory card is not installed.

If each configuration information corresponds with each other in step S1304, the process proceeds to step S1305. At step S1305, the data processing unit 210 causes the recording medium control unit 240 and the data managing unit 220 to read the status information 52 from the SD memory card 5 to RAM 101. Then, the data processing unit 210 confirms whether current mode to boot the printer 1 is to utilize the SD memory card 5, at step S1307. If the data processing unit 210 recognizes the mode booted by the SD memory card 5 is the current mode, the data processing unit 210 causes the recording medium control unit 240 to boot based on the status information 52 of the SD memory card 5 that is read to RAM 101, at step S1309. Then, the printer 1 waits for an operation by the user.

On the other hand, at step S1307, if the data processing unit 210 recognizes the mode to boot by the SD memory card 5 is not the current mode, the process proceeds to step S1308. At step S1308, the data processing unit 210 causes the data managing unit 220 to store the status information 52 read to RAM 101 into NVRAM 102. At step S1310, the data processing unit 210 causes the data managing unit 220 to boot based on the status information 52 stored in NVRAM 102 at step S1308. Then, the printer 1 waits for an operation by the user.

Figure 14:
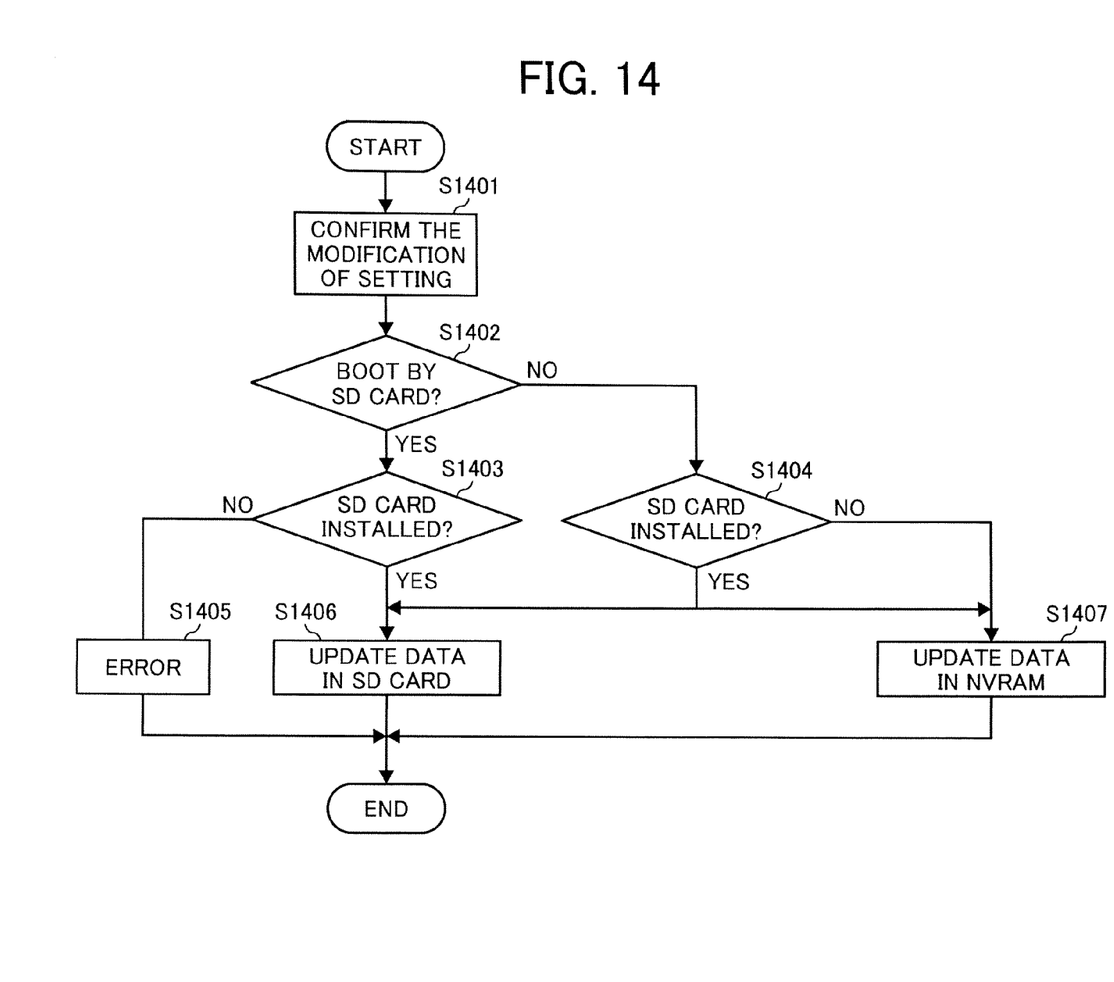
FIG. 14 is a flowchart of a process performed by the image processing apparatus when the status information is modified.

FIG. 14 illustrates the process performed by the printer 1 in case the status information is modified. At step S1401, the panel I/O control unit 230 recognizes a received instruction for modifying the status information. At step S1402, the data processing unit 210 confirms what the current mode is. If current mode is to boot by the SD memory card 5, the data processing unit 210 causes at step 1403 the recording medium control unit 240 to confirm whether the SD memory card 5 is installed. On the other hand, when the current mode is not the mode to boot by the SD memory card 5, the process proceeds to step S1404.

If step S1403 determines the SD memory card 5 is installed, flow proceeds to step S1406 in which the data processing unit 210 causes the recording medium control unit 240 to update the status information 52 stored in the SD memory card 5 to modified information received at step S1401. On the other hand, if the SD memory card 5 is not installed, flow proceeds to step S1405 in which the data processing unit 210 causes the panel I/O control unit 230 to display an error screen in the operation panel 106.

At step S1404, the data processing unit 210 causes the recording medium control unit 240 to confirm whether the SD memory card 5 is installed. If the SD memory card 5 is installed, the data processing unit 210 causes the recording medium control unit 240 to update the status information 52 stored in the SD memory card 5 to modified information received at step S1401 and also causes the data managing unit 220 to update the status information 1021 stored in NVRAM 102 to modified information received at step S1401. On the other hand, if the data processing unit 210 recognizes the SD memory card 5 is not installed in step S1404, the process proceeds to step S1407.

At step S1407, the data processing unit 210 causes the data managing unit 220 to update the status information 1021 stored in NVRAM 102 to modified information received at step S1401 and ends the process.

Herewith, in addition to the effect of the first and second embodiment, it will be possible for the printer 1 to update the status information adequately according to the current mode. According to any disclosed embodiment, the invention may be used when configuring a new or additional printer for any reason.

A computer readable storage medium according to the present invention causes a computer to carry out the processes described above. More particularly, the computer readable storage medium stores a computer program that causes the computer to operate as an apparatus such as the printer described above. The effects of the embodiments described above can be obtained by the computer readable storage medium.

The computer readable program may be prestored in a storage part or means within the computer, such as the ROM and the HDD. On the other hand, the computer readable program may be stored in a non-volatile recording medium or memory, such as a CD-ROM, flexible disk, a SRAM, an EEPROM, a memory card, a magnetic recording medium, an optical recording medium and a magneto-optical recording medium. The computer-readable program stored in the non-volatile recording medium or memory may be installed into the computer and executed by the CPU or, the CPU may read the computer-readable program from the non-volatile recording medium or memory and execute the computer-readable program, so as to realize the functions of any of the embodiments and modifications described above. The computer-readable program may be executed by downloading the computer-readable program from an external device that is provided with a recording medium recorded with the computer-readable program, or from an external device having a storage part or means stored with the computer-readable program.

Further, the present invention is not limited to these embodiments, but various variations and modifications may be made without departing from the scope of the present invention. Obviously, numerous modifications and variations of the present invention are possible in light of the above teachings. It is therefore to be understood that within the scope of the appended claims, the invention may be practiced otherwise than as specifically described herein.

We claim:

1. An image forming apparatus, comprising:
    a storage unit configured to store information regarding the image forming apparatus, the information including first setting information including at least one of a communication setting that includes an IP address, subnet mask, or gateway, an operating environment setting, and a detail setting related to use of a paper tray, toner color, or a print language;
    a reading unit configured to read information, including second setting information, from a detachable recording medium previously mounted to another image forming apparatus;
    a control unit configured to recognize whether the information read from the detachable recording medium previously mounted to the another image forming apparatus can be applied to the image forming apparatus based on the first setting information stored in the storage unit and the second setting information read from the detachable recording medium previously mounted to the another image forming apparatus, the control unit being further configured to apply the information read from the detachable recording medium previously mounted to the another image forming apparatus to the image forming apparatus if the information read from the detachable recording medium previously mounted to the another image forming apparatus is recognized as applicable to the image processing apparatus.

2. An image forming apparatus as claimed in claim 1, wherein:
    the control unit is further configured to recognize the information read from the detachable recording medium previously mounted to the another image forming apparatus as applicable to the image forming apparatus if setting information corresponding to the second setting information stored in the detachable recording unit previously mounted to the another image forming apparatus is stored in the storage unit.

3. An image forming apparatus as claimed in claim 2, wherein:
    the control unit is further configured to recognize whether the information read from the detachable recording medium previously mounted to the another image forming apparatus is applicable to the image forming apparatus by comparing character string information stored in the detachable recording medium previously mounted to the another image forming apparatus and stored in the storage unit.

4. An image forming apparatus as claimed in claim 3, wherein:
    the control unit is further configured to recognize the information read from the detachable recording medium previously mounted to the another image forming apparatus as applicable to the image forming apparatus if at least one of the character string information stored in the detachable recording medium previously mounted to the another image forming apparatus and the storage unit corresponds with each other.

5. An image forming apparatus as claimed in claim 4, wherein the character string information includes at least one of device model information, device identification, and user information of the image forming apparatus.

6. An image forming apparatus as claimed in claim 5, wherein the storage unit is further configured to store information indicating a relationship with the another image forming apparatus which is applicable to the image forming apparatus.

7. An image forming apparatus as claimed in claim 1, the information that wherein the information stored in the detachable recording medium previously mounted to the another image forming apparatus includes information used to boot the image forming apparatus, and the second setting information of the another image forming apparatus.

8. An image forming apparatus as claimed in claim 7, wherein:
    the control unit is further configured to recognize whether the information read from the detachable recording medium previously mounted to the another image forming apparatus is applicable to the image forming apparatus before the image forming apparatus is booted and to boot the image forming apparatus using the information read from the detachable recording medium previously mounted to the another image forming apparatus if the information read from detachable recording medium previously mounted to the another image forming apparatus is applicable to the image forming apparatus.

9. An image forming apparatus as claimed in claim 8, wherein the control unit is further configured to reflect the changed information in the detachable recording medium previously mounted to the another image forming apparatus if one of the information stored in the storage unit corresponding to the information read from the detachable recording medium previously mounted to the another image forming apparatus is changed.

10. An image forming apparatus as claimed in claim 1, wherein the control unit is further configured to avoid writing the information read from the detachable recording medium previously mounted to the another image forming apparatus over corresponding information stored in the storage unit.

11. An image forming apparatus, comprising:
a storage means for storing information regarding the image forming apparatus, the information including first setting information including at least one of a communication setting that includes an IP address, subnet mask, or gateway, an operating environment setting, and a detail setting related to use of a paper tray, toner color, or a print language;
a reading means for reading information, including second setting information, from a detachable recording medium previously mounted to another image forming apparatus;
a control means for recognizing whether the information read from the detachable recording medium previously mounted to the another image forming apparatus can be applied to the image forming apparatus based on the first setting information stored in the storage means and the second setting information read from the detachable recording medium previously mounted to the another image forming apparatus, the control means being further for applying the information read from the detachable recording medium previously mounted to the another image forming apparatus to the image forming apparatus if the information read from the detachable recording medium previously mounted to the another image forming apparatus is recognized as applicable to the image forming apparatus.

12. An image forming apparatus as claimed in claim 11, wherein the control means further comprises means for recognizing the information read from the detachable recording medium previously mounted to the another image forming apparatus as applicable to the image forming apparatus if setting information corresponding to the second setting information stored in the detachable recording medium previously mounted to the another image forming apparatus is stored in the storage means.

13. An image forming apparatus as claimed in claim 12, wherein the control means further comprises means for recognizing whether the information read from the detachable recording medium previously mounted to the another image forming apparatus is applicable to the image forming apparatus by comparing character string information stored in the detachable recording medium previously mounted to the another image forming apparatus and stored in the storage means.

14. An image forming apparatus as claimed in claim 13, wherein the control means further comprises means for recognizing the information read from the detachable recording medium previously mounted to the another image forming apparatus as applicable to the image forming apparatus if at least one of the character string information stored in the detachable recording medium previously mounted to the another image forming apparatus and the storage means corresponds with each other.

15. An image forming apparatus as claimed in claim 14, wherein the character string information includes at least one of device model information, device identification, and user information of the image forming apparatus.

16. An image forming apparatus as claimed in claim 15, wherein storage means further stores the information indicating a relationship with the another image forming apparatus which is applicable to the image forming apparatus.

17. An image forming apparatus as claimed in claim 11, wherein the information stored in the detachable recording medium previously mounted to the another image forming apparatus includes information used to boot the image forming apparatus.

18. An image forming apparatus as claimed in claim 17, wherein the control means further comprising means for recognizing whether the information read from the detachable recording medium previously mounted to the another image forming apparatus is applicable to the image forming apparatus before the image forming apparatus is booted, and means for booting the image forming apparatus using the information read from the detachable recording medium previously mounted to the another image forming apparatus if the information read from detachable recording medium previously mounted to the another image forming apparatus is applicable to the image forming apparatus.

19. An image forming apparatus as claimed in claim 18, wherein the control means further comprises means for reflecting the changed information in the detachable recording medium previously mounted to the another image forming apparatus if one of the information stored in the storage means corresponding to the information read from the detachable recording medium previously mounted to the another image forming apparatus is changed.

20. An image forming apparatus as claimed in claim 11, wherein the control means further comprises means for avoiding writing the information read from the detachable recording medium previously mounted to the another image forming apparatus over corresponding information stored in the storage means.

21. A control method for an image forming apparatus comprising the steps of:
storing information regarding the image forming apparatus in a storage device, the information including first setting information including at least one of a communication setting that includes an IP address, subnet mask, or gateway, an operating environment setting, and a detail setting related to use of a paper tray, toner color, or a print language;
reading information, including second setting information, from a detachable recording medium previously mounted to another image forming apparatus;
recognizing whether the information read from the detachable recording medium previously mounted to the another image forming apparatus can be applied to the image forming apparatus based on the first setting information stored in the storage device and the second setting information read from the detachable recording medium previously mounted to the another image forming apparatus; and
applying the information read from the detachable recording medium previously mounted to the another image forming apparatus to the image forming apparatus if the information read from the detachable recording medium previously mounted to the another image forming apparatus is recognized as applicable to the image forming apparatus.

22. A non-transitory computer readable storage medium which stores a computer program that when executed causes a computer to perform a process, the process comprising:
storing information regarding an image forming apparatus in a storage device, the information including first setting information including at least one of a communication setting that includes an IP address, subnet mask, or gateway, an operating environment setting, and a detail setting related to use of a paper tray, toner color, or a print language;

reading information, including second setting information, from a detachable recording medium previously mounted to another image forming apparatus;

recognizing whether the information read from the detachable recording medium previously mounted to the another image forming apparatus can be applied to the image forming apparatus based on the first setting information stored in the storage device and the second setting information read from the detachable recording medium previously mounted to the another image forming apparatus; and applying the information read from the detachable recording medium previously mounted to the another image forming apparatus to the image forming apparatus if the information read from the detachable recording medium previously mounted to the another image forming apparatus is recognized as applicable to the image forming apparatus.

* * * * *